(12) United States Patent
Kamiyama et al.

(10) Patent No.: US 8,240,338 B2
(45) Date of Patent: Aug. 14, 2012

(54) AUXILIARY TOOL FOR FILLING PIPE WITH FLUID, AND FLUID INJECTION METHOD FOR INJECTING FLUID INTO PIPE

(75) Inventors: Takao Kamiyama, Hiratsuka (JP); Guochun Xu, Hiratsuka (JP); Takashi Ookubo, Hiratsuka (JP); Seiya Chiba, Hiratsuka (JP)

(73) Assignee: Shonan Gosei-Jushi Seisakusho K.K. (JP)

( * ) Notice: Subject to any disclaimer, the term of this patent is extended or adjusted under 35 U.S.C. 154(b) by 1170 days.

(21) Appl. No.: 12/079,494

(22) Filed: Mar. 27, 2008

(65) Prior Publication Data

US 2008/0271808 A1 Nov. 6, 2008

(30) Foreign Application Priority Data

Mar. 28, 2007 (JP) .................................. 2007-084010

(51) Int. Cl.
*F16L 55/18* (2006.01)
(52) U.S. Cl. ......................... 138/97; 138/98; 405/184.1
(58) Field of Classification Search .............. 138/97–98; 405/184.1–184.3
See application file for complete search history.

(56) References Cited

U.S. PATENT DOCUMENTS

| 4,440,194 | A | * | 4/1984 | Kinumoto et al. | 138/89 |
| 5,049,003 | A | * | 9/1991 | Barton | 405/184.1 |
| 5,199,463 | A | * | 4/1993 | Lippiatt | 138/98 |
| 5,230,842 | A | * | 7/1993 | Munde | 264/34 |
| 5,447,664 | A | * | 9/1995 | Ito et al. | 264/35 |
| 5,590,689 | A | * | 1/1997 | Toyoda et al. | 138/97 |
| 5,609,186 | A | * | 3/1997 | Satake et al. | 138/97 |
| 5,632,952 | A | * | 5/1997 | Mandich | 264/516 |
| 5,727,597 | A | * | 3/1998 | Fisco | 138/98 |
| 5,740,838 | A | * | 4/1998 | Satake et al. | 138/97 |
| 5,983,948 | A | * | 11/1999 | Yagi et al. | 138/98 |
| 7,052,567 | B1 | * | 5/2006 | Blackmore et al. | 156/94 |
| 7,523,764 | B2 | * | 4/2009 | Lepola et al. | 138/98 |

* cited by examiner

*Primary Examiner* — Gregory Huson
*Assistant Examiner* — Nicolas A Arnett
(74) *Attorney, Agent, or Firm* — Adams & Wilks

(57) ABSTRACT

An auxiliary tool comprises a body formed of a core material and an elastic cloth covering that covers the surface of the core material. The body is configured for insertion into a pipe ahead of a fluid used to fill the pipe so that during filling of the pipe the flow of the fluid advances the body through the pipe to force out and discharge from the pipe air existing ahead of the body while the body is advanced inside of the pipe.

19 Claims, 3 Drawing Sheets

AUXILIARY TOOL FOR FILLING PIPE WITH FLUID, AND FLUID INJECTION METHOD FOR INJECTING FLUID INTO PIPE

BACKGROUND OF THE INVENTION

1. Field of the Invention

The present invention relates to an auxiliary tool for filling a pipe with water, hot water, or another such fluid without any air pockets, even when the pipe has curved parts or bent parts. The present invention also relates to a fluid injection method for injecting this fluid into a pipe.

2. Description of the Prior Art

When underground sewerage pipes and the like become aged, a pipe repair method is performed wherein the inside surfaces of the pipes are lined (Japanese Laid-open Patent Application No. 1990-194930). When the pipes are to be lined, a material impregnated with a thermosetting resin is inserted into the pipes and cured by the injection of steam, hot water, or another such heating medium.

However, unlike sewerage pipes, underground electric power tubes, gas pipes, industrial pipes, and other such pipes do not have a unilateral gradient, but instead have curved parts and bent parts. This leads to problems in which the cooled heating medium does not smoothly return during lining, and also problems in which air pockets form in the peaks and dips of curved pipes, and the lining material is not heated uniformly.

An object of the present invention is to provide an auxiliary tool for completely filling a pipe having curved parts and bent parts with fluid without any air pockets, and also to provide a fluid injection method for injecting fluid into a pipe by using this auxiliary tool.

SUMMARY OF THE INVENTION

To achieve these objects, the auxiliary tool of the present invention inserted into a pipe in order to fill the pipe with fluid is configured from a core material and an elastic cloth covering that covers the surface of the core material.

This auxiliary tool is shaped so as to be fitted into a pipe by selecting the dimensions of the core material and the thickness of the cloth covering.

In the present invention, the auxiliary tool is inserted into a pipe, and a fluid is then injected into the pipe. The auxiliary tool is constantly positioned at the head of the injected fluid, and the auxiliary tool advances forward while air in the pipe is forced out by the pressure of the injected fluid. The fluid fills the pipe without creating any air pockets in the pipe.

In the present invention, the use of the auxiliary tool wherein a core material is covered with an elastic cloth makes it possible to fill a pipe having a complex gradient with water, hot water, or another such fluid without creating any air pockets in the curved pipe.

Further features of the invention, its nature and various advantages will be more apparent from the accompanying drawings and the following detailed description of the invention.

DETAILED DESCRIPTION OF THE PREFERRED EMBODIMENT

Figure 1:
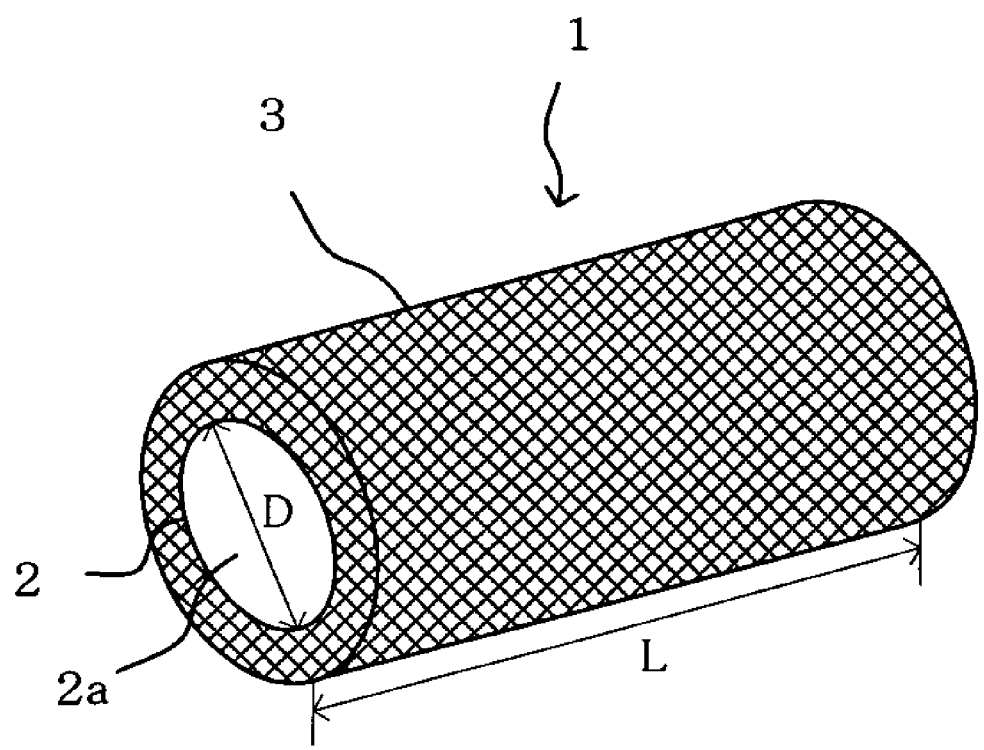
FIG. 1 is a perspective view schematically showing an auxiliary tool of the present invention.

Preferred embodiments of the present invention will be described hereinafter with reference to the accompanying drawings. The present invention allows for various other modifications, and the embodiments depicted herein are provided to describe the present invention and must not be interpreted to be limiting of the scope of the present invention. The shapes and other features of the elements in the drawings are exaggerated in order to emphasize a clearer description, and must not be interpreted to be limiting of the design and dimensions of the elements in the present invention.

FIG. 1 is a perspective view schematically showing an auxiliary tool 1 for filling a pipe with fluid. This pipe is an underground sewerage pipe, an electric power tube, a gas pipe, or an industrial pipe, and has curved parts and bent parts. This pipe is aged, and will therefore be repaired or rehabilitated using a tubular pipe lining material. The fluid is water or hot water, for example; and this fluid can heat and cure a thermosetting resin impregnated in the tubular pipe lining material.

The auxiliary tool 1 shown in FIG. 1 is a body obtained by covering the entire external peripheral surface of a cylindrical core material 2 with a cloth covering 3. The core material 2 retains the shape of the auxiliary tool 1, and the cross-sectional shape thereof is substantially the same as the cross-sectional shape of a pipe that has the pipe lining material applied to the inner wall thereof. The dimension of the core material (diameter D in the case that the cross section is a circle) is preferably 60 to 98% of the nominal dimension of the pipe with the pipe lining material applied thereto. The length L of the core material 2 is not particularly limited, but is preferably 80% or more of the cross-sectional dimension.

The material, configuration, and other features of the core material 2 are not particularly limited. Possible examples of the material include wood, plastic, metal, and an alloy. Possible examples of the configuration include a solid block, a hollow cylinder, and a netted tube. For example, a wood block, a vinyl chloride can, a polyethylene can, an aluminum can, a stainless steel can, or the like are suitable. In cases in which the core material 2 is not solid, it is preferable that the end surface 2a subjected to fluid pressure at least be airtight, or an end surface that the fluid has difficulty flowing through.

As a modification, the core material 2 may be a cone or may have a circular base at the distal end. Furthermore, a fitting may be provided to attach a rope at both end surfaces of the core material.

The purpose of the cloth covering 3 that covers the core material 2 is to tightly fit the auxiliary tool 1 against the thermosetting resin impregnated tubular pipe lining material with which the pipe is rehabilitated; therefore, the cloth covering is configured from an elastic material. The thickness of the cloth covering 3 is designed to fulfill the following expression.

Thickness of cloth covering<=(smaller than or equal to)(nominal dimension of the rehabilitated pipe−dimension of the core material)/2+Compressed amount of cloth covering The material, configuration, and other features of the cloth covering 3 are not particularly limited. Possible examples of the material for the cloth covering 3 include natural fiber, cotton, synthetic fiber, expanded rubber, expanded plastic, or the like. Suitable examples of the configuration for the cloth covering 3 include a woven fabric, a nonwoven fabric (felt), a foam, cotton, or other such materials, as well as composites thereof.

The method for covering the core material 2 with the cloth covering 3 is not particularly limited. Suitable examples of methods include using the elasticity of the cloth covering 3 to directly attach it to the core material 2. The cloth covering 3 may be fused to the core material 2 by heat or bonded thereto using an adhesive. Alternatively, the cloth covering 3 can be bound around the core material 2 using bands.

According to the method of injecting fluid into the pipe, the auxiliary tool 1 of the present invention is inserted into the pipe through the side in which fluid is to be injected, fluid pressure is created with a pump or the like, and fluid is injected while the auxiliary tool 1 is thrust forward.

Figure 2A:
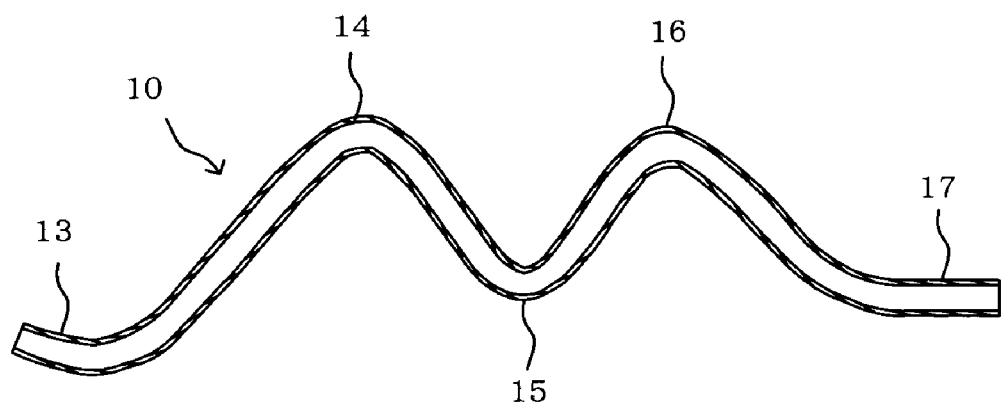
FIGS. 2a-2b are illustrative views showing how air pockets are formed in a pipe.

FIG. 2a shows a pipe 10 which is curved into an M shape and into which a tubular pipe lining material (not shown) impregnated with a thermosetting resin is inserted. The lining material is inserted into the pipe in an everted fashion or a pull-in fashion, and is expanded against the inner wall of the pipe 10. The pipe 10 has two peaks 14, 16 from the fluid injection side 13 and is curved so that one depression 15 can be formed between the two peaks. The curves in the pipe 10 are exaggerated in the drawing for the sake of the description.

Figure 2B:
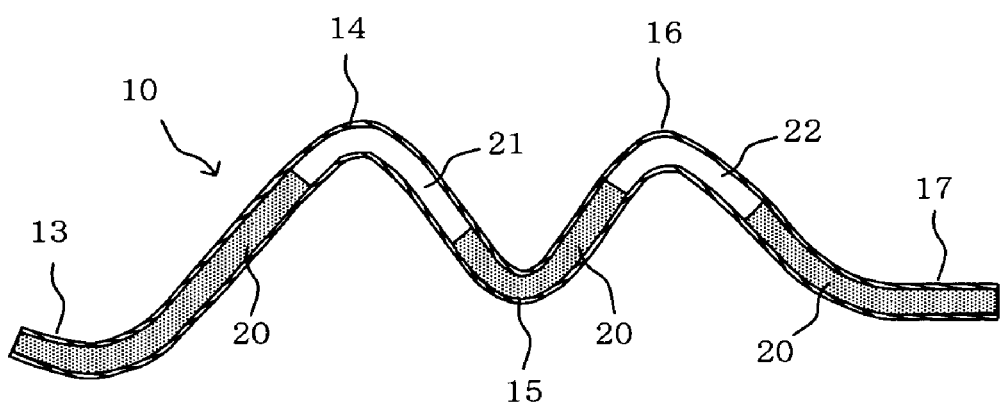

To cure the thermosetting resin in the pipe lining material, the fluid discharge side 17 of the pipe 10 is opened and a fluid 20 is injected through the injection side 13. The level of fluid 20 gradually rises at the upward slope between the injection side 13 and the peak 14 of the pipe, as shown in FIG. 2b. When the injected fluid passes the peak 14, fluid accumulates in the depression 15, and the depression 15 is rapidly filled with the fluid 20. The air between the peak 14 and the depression 15 has nowhere to escape, and an air pocket 21 is formed.

When fluid 20 is filled further, the level of the fluid 20 continues to rise up to the other peak 16. When the injected fluid 20 passes the peak 16, the fluid accumulates in the discharge side 17 at the bottom, the air between the peak 16 and the discharge side 17 has nowhere to escape, and an air pocket 22 is similarly formed near the peak 16. Even if the fluid 20 is discharged through the discharge side 17, the ranges of the air pockets 21, 22 do not change.

Figure 3A:
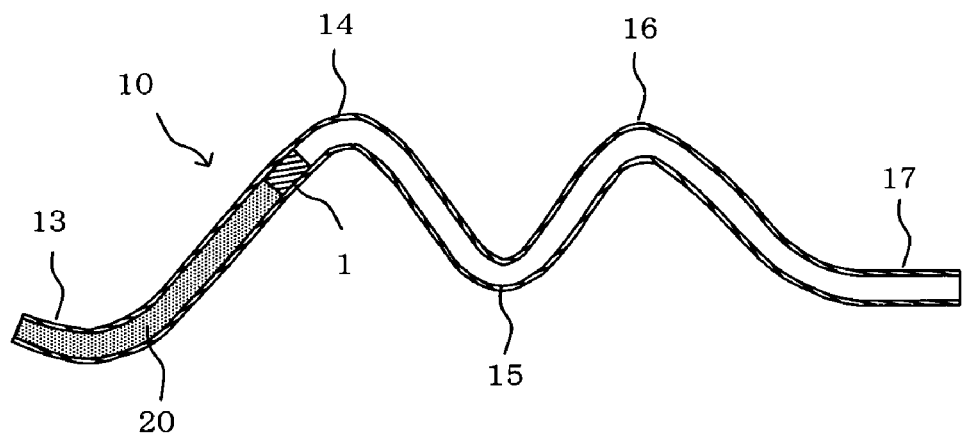
FIGS. 3a-3c are illustrative views showing a state in which the auxiliary tool is used to fill the pipe with fluid when the fluid is injected into the pipe.
Figure 3B:
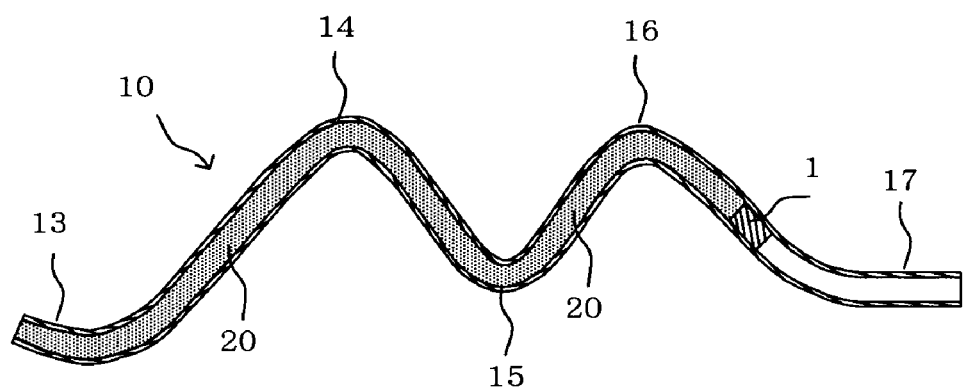
Figure 3C:
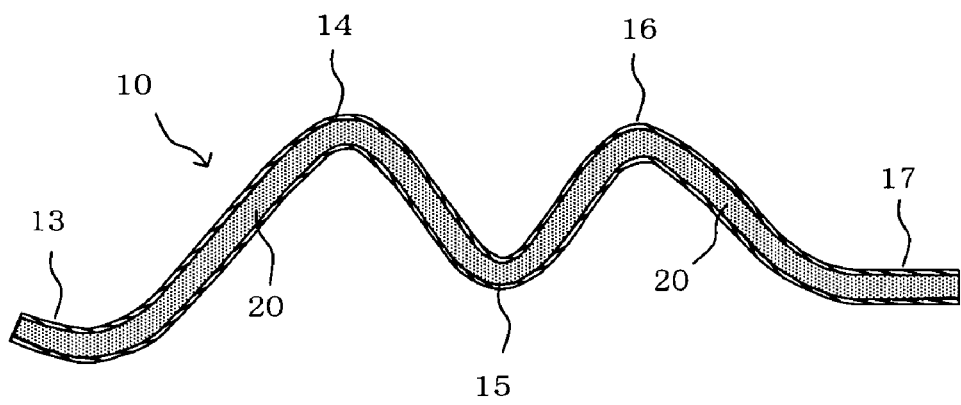

The auxiliary tool 1 in FIG. 1 is used to prevent such air pockets from forming, as shown in FIGS. 3a through 3c.

The auxiliary tool 1 is made, for example, by attaching the cloth covering 3 to the core material 2. The cloth covering 3 is composed of an elastic woven fabric having a thickness that is 20% of the inside diameter of the pipe 10 lined with a tubular lining material. The core material 2 is composed of a plastic hollow solid cylindrical body (the end surface 2a is hermetically sealed) having a diameter D that is 90% of the inside diameter of the lined pipe 10.

The tubular lining material (not shown) with a thermosetting resin impregnated therein is inserted into the pipe 10 to be repaired and expanded against the inner wall thereof. The auxiliary tool 1 is then inserted through the injection side 13 of the pipe 10, and the fluid 20 is injected through the injection side 13. The auxiliary tool 1 is constantly positioned at the head of the fluid 20, and is moved towards the discharge side 17 through the pipe 10 by the fluid pressure, as shown in FIG. 3a. Since the cloth covering 3 is elastic and flexible, the auxiliary tool 1 passes through the peak 14 in the pipe 10 while maintaining a tight fit against the pipe wall, and gradually continues through without slipping while forcing out air. Therefore, an air pocket 21 is not formed between the peak 14 and depression 15 as shown in FIG. 2b.

When the auxiliary tool 1 passes through the depression 15 in the pipe 10, the auxiliary tool 1 gradually advances while forcing out air, similar to the area between the injection side 13 and the depression 15. The auxiliary tool 1 then reaches the discharge side 17 and is discharged out, as shown in FIG. 3b. As a result, the pipe 10 is completely filled with the fluid 20, as shown in FIG. 3c.

In cases in which the fluid is water, the water is continually heated and circulated, and in cases in which the fluid is hot water, the hot water is circulated, thus heating the thermosetting resin impregnated in the pipe lining material. The heating is continued for a specific amount of time to cure the thermosetting resin. The fluid 20 is then discharged out of the pipe 10.

Since there are no air pockets formed in the pipe 10 when the pipe lining material is heated, the pipe lining material is uniformly heated and cured, and the pipe 10 can be lined in a superior manner.

What is claimed is:

1. An auxiliary tool configured for insertion into a pipe during filling of the pipe with a fluid, the auxiliary tool comprising: a body formed of a core material and an elastic cloth covering that covers the surface of the core material, the body being configured for insertion into the pipe ahead of the fluid used to fill the pipe so that during filling of the pipe the flow of the fluid advances the body through the pipe to force out and discharge from the pipe air existing ahead of the body while the body is advanced inside of the pipe.

2. An auxiliary tool according to claim 1; wherein the cloth covering is a woven fabric or nonwoven fabric composed of natural fiber, hair, cotton, or a synthetic fiber.

3. An auxiliary tool according to claim 1; wherein the core material is a block or a hollow body formed of wood, plastic, or metal.

4. An auxiliary tool according to claim 1; wherein the cloth covering is formed of an expanded rubber or plastic material.

5. In combination with a pipe that is filled with a fluid by injecting the fluid into the pipe from an injection side of the pipe until the fluid exits through a discharge side of the pipe, an auxiliary tool comprising: a body formed of a core material and an elastic cloth covering an outer peripheral surface of the core material, the body configured for insertion into the pipe ahead of the fluid so that during filling of the pipe the injected fluid causes the auxiliary tool to be moved ahead of the fluid through the pipe towards the discharge side of the pipe until the pipe is filled with the fluid and exits through the discharge side without the generation of an air pocket between the injection and discharge sides of the pipe.

6. A combination according to claim 5; wherein the cloth covering is a woven fabric or nonwoven fabric selected from one of natural fibers and synthetic fibers.

7. A combination according to claim 5; wherein the core material comprises a block or a hollow body formed of wood, plastic or metal.

8. A combination according to claim 5; wherein the cloth covering is formed of a plastic or rubber material.

9. A combination according to claim 5; wherein the pipe contains a tubular lining material impregnated with a thermosetting resin and expanded against an inner wall of the pipe; and wherein the body of the auxiliary tool is configured to move through the expanded tubular lining material during filling of the pipe.

10. A fluid injection method, comprising the step of:
preparing an auxiliary tool comprising a core material and an elastic cloth covering that covers the surface of the core material;
inserting the auxiliary tool into a pipe; and injecting a fluid into the pipe from an injection side of the pipe to cause the auxiliary tool to be moved through the pipe towards a discharge side of the pipe without creating an air pocket between the injection and discharge sides of the pipe.

11. A fluid injection method according to claim 10; wherein the cloth covering is a woven fabric or nonwoven fabric composed of natural fiber, hair, cotton, or a synthetic fiber.

12. A fluid injection method according to claim 10; wherein the core material is a block or a hollow body formed of wood, plastic, or metal.

13. A fluid injection method according to claim 10; wherein the cloth covering is formed of an expanded rubber or plastic material.

14. A fluid injection method, comprising the step of:
preparing an auxiliary tool comprising a core material and an elastic cloth covering that covers the surface of the core material;
inserting a tubular lining material impregnated with a thermosetting resin into the pipe and expanding it against an inner wall thereof;
inserting the auxiliary tool into the expanded lining material; and
injecting a fluid into the pipe from an injection side of the pipe to cause the auxiliary tool to be moved through the expanded lining material towards a discharge side of the pipe without creating an air pocket between the injection and discharge sides of the pipe.

15. A fluid injection method according to claim 14; wherein the fluid is hot water or water heated during the injecting step for curing the thermosetting resin impregnated in the lining material.

16. A fluid injection method according to claim 14; wherein the cloth covering is a woven fabric or nonwoven fabric composed of natural fiber, hair, cotton, or a synthetic fiber.

17. A fluid injection method according to claim 14; wherein the core material is a block or a hollow body formed of wood, plastic, or metal.

18. A fluid injection method according to claim 14; wherein the cloth covering is formed of an expanded rubber or plastic material.

19. A fluid injection method according to claim 14; wherein the core material comprises a tubular body having a diameter that is 90% of an inner diameter of the pipe lined with the tubular lining material.

* * * * *